(No Model.)

G. ANDROSS.
FRAME FOR EYEGLASSES.

No. 245,268. Patented Aug. 9, 1881.

Witnesses.
Chas. L. Burdett
Edwin F. Dimock

Inventor.
George Andross
by Theo. G. Ellis, Attorney

UNITED STATES PATENT OFFICE.

GEORGE ANDROSS, OF HARTFORD, CONNECTICUT.

FRAME FOR EYEGLASSES.

SPECIFICATION forming part of Letters Patent No. 245,268, dated August 9, 1881.

Application filed June 13, 1881. (No model.)

*To all whom it may concern:*

Be it known that I, GEORGE ANDROSS, of Hartford, in the county of Hartford and State of Connecticut, have invented certain new and useful Improvements in Frames for Eyeglasses; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My invention relates to eyeglasses or spectacles, and more particularly to such as are intended to be supported in place before the eyes without resting upon the bridge of the nose.

The object of my invention is to provide a means for adjusting the position of the glasses before the eye, and also to regulate their distance apart, which varies in different persons; also, to provide a cheap and easy method of constructing such frames.

Figure 1:
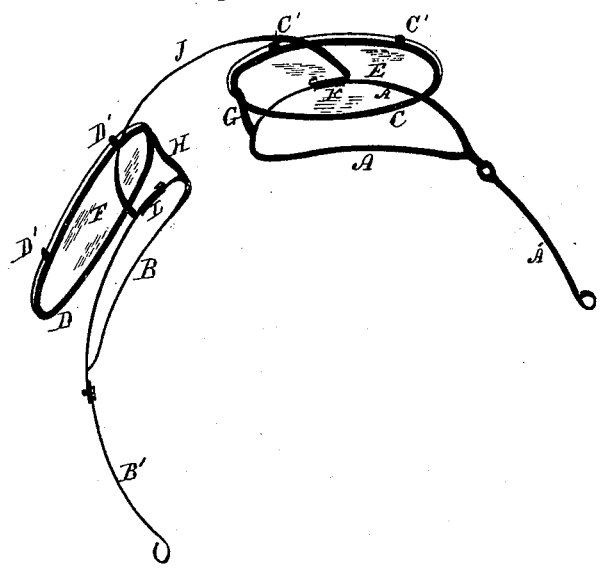
Figure 2:
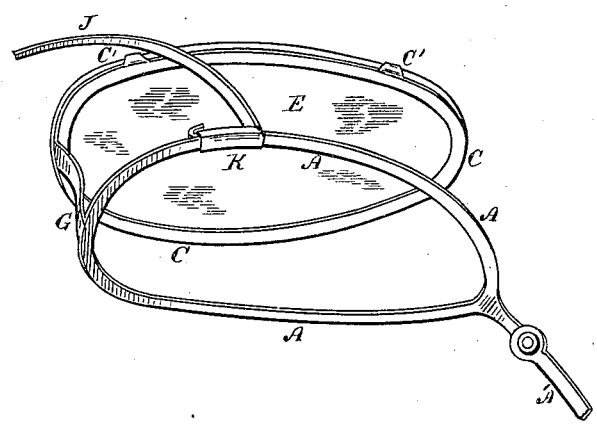

In the accompanying drawings, illustrating my invention, Figure 1 shows a perspective view of my improved eyeglasses. Fig. 2 shows an enlarged view of one side of the same, giving more clearly the details of the construction.

A and B are the bows, which are intended to rest close against the face, around the eye, and support the lenses in their proper positions. They are provided with arms A' and B', which can be folded up back of the bows when the glasses are not in use, and which can be extended, by turning on their pivots, so as to embrace the temples of the wearer and hold the glasses on in the customary manner, there being no pressure upon the nose, the glasses being held in place by the arms and by the bows resting around the eye.

C and D are rings for holding the lenses E and F. They are provided with clips C' and D', which are bent over the edge of the glass. These rings are made whole around the glass, and are connected with the bows A and B by means of the spring studs or connections G and H. These studs support the outer ring in its position, and are capable of being somewhat bent, so as to adjust the position of the lens. They also allow the parts to spring together and occupy less space when the glasses are put into a case. The lenses are thus supported in front of the eye with no metallic connection around them to break or reflect the light which comes in at the sides. They are thus easier for the eyes than with the ordinary construction.

J is the spring which connects the two sides of the frame and causes the arms A' and B' to press against the sides of the forehead. The ends of this spring are attached to slides K and L, which surround the upper part of the bows and can be moved so as to increase or diminish the lateral distance between the lenses. By the construction shown in the drawings the spring is passed under these slides and bent over to hold it in place. This is a cheap and strong construction; but the spring can be attached to the slides in any other convenient manner, or the spring and slides can be made in one piece.

By means of my improvement the position of the lenses can be adjusted to the best distance in front of the eye and moved laterally until the line of sight will pass through the middle of the lens, and in this manner be made to conform to the different widths between the eyes in different persons.

My improved frame can also be easily and cheaply made by cutting the parts A, C, and G out of a flat sheet of metal and bending the parts into their proper positions, no soldering or other union of the parts being required.

What I claim as my invention is—

1. In a frame for eyeglasses, the bow A and the ring C, connected by the single spring-stud G, substantially as described.

2. In a frame for eyeglasses, the slide K, in combination with the bow A and the spring J, substantially as described.

GEORGE ANDROSS.

Witnesses:
EDWIN F. DIMOCK,
THEO. G. ELLIS.